US005810168A

United States Patent [19]
Eggering

[11] Patent Number: 5,810,168
[45] Date of Patent: Sep. 22, 1998

[54] TOOL BOX WITH INTEGRAL AM/FM RADIO AND POWER OUTLETS

[76] Inventor: Steven A. Eggering, 10 Montauk Dr., St. Louis, Mo. 63146

[21] Appl. No.: 853,443

[22] Filed: May 9, 1997

[51] Int. Cl.⁶ .............................. B65D 85/00; H04B 1/08
[52] U.S. Cl. ......................... 206/372; 361/625; 455/344
[58] Field of Search ................................ 206/216, 372, 206/373, 542; 361/625; 455/344, 351

[56] References Cited

U.S. PATENT DOCUMENTS

| | | | |
|---|---|---|---|
| 2,671,623 | 3/1954 | Toulmin, Jr. ............................. | 455/344 |
| 4,050,493 | 9/1977 | Cho ........................................ | 455/344 |
| 4,279,342 | 7/1981 | Van Pelt ................................. | 206/542 |
| 4,571,740 | 2/1986 | Kirby et al. ............................ | 455/344 |
| 4,817,191 | 3/1989 | Adams .................................... | 455/344 |
| 4,939,912 | 7/1990 | Leonovich, Jr. ....................... | 455/344 |
| 5,235,822 | 8/1993 | Leonovich, Jr. ....................... | 206/542 |
| 5,339,956 | 8/1994 | Thomason .............................. | 206/372 |
| 5,344,339 | 9/1994 | Cheslock ................................ | 206/372 |
| 5,447,041 | 9/1995 | Piechota ................................. | 206/542 |

OTHER PUBLICATIONS

Operation manual for "Jeep Boom Box", pp. 1–12, no date.

*Primary Examiner*—Jimmy G. Foster
*Attorney, Agent, or Firm*—Herzog, Crebs & McGhee, LLP

[57] ABSTRACT

A tool box with integrated electrical outlets and AM/FM radio. A radio is mounted on the interior of a tool box with the speakers mounted flush on the front face of the exterior. Additionally, a plurality of power outlets are located on the exterior. The radio and the power outlets are electrically coupled to an input socket for supplying power thereto. The radio and the speakers are adapted for use in harsh working conditions such as dust and rain. To that cause, the speakers should be made of a water or moisture resistant material, and a gasket may be disposed underneath the control knobs of the radio. A grill may also be mounted over the speakers to provide additional protection. The electrical system is protected by a GFI circuit breaker.

19 Claims, 2 Drawing Sheets

TOOL BOX WITH INTEGRAL AM/FM RADIO AND POWER OUTLETS

FIELD OF THE INVENTION

The present invention relates generally to hand tool boxes, and more particularly, but not by way of limitation, the present invention relates to an improved tool box incorporating a radio and power outlets.

BACKGROUND OF THE INVENTION

The construction worker in particular carries a tool box of appreciable size to a job site in which is carried a variety of tools contemplated for use in the job. There are many styles of tool boxes with some that incorporate such things as integral power cord reels, for instance U.S. Pat. No. 5,339,956 issued Aug. 23, 1994 to Thomason entitled Tool Box With Combined Elements. However, if the power cord reel is of appreciable size, which it should be, in order to store a large amount of power cord, there is little room left for tool storage. There has also been patented a utility bucket for holding and carrying tools that has an electrical power strip attached along the outside thereof. See U.S. Pat. No. 4,875,878 issued to Meyer on Oct. 24,1989 entitled Extension Cord/Tool Carrier.

What has been recognized is that space is tight on a construction site and that there is a need for multiple electrical outlets to power the various types of tools required. Because of this, having a radio, and an outlet to plug it in to, is a luxury. Furthermore, trips to a supply truck for tools and/or a radio are time consuming. Frequently, construction site foremen will not allow workers to make special trips just to retrieve a radio.

In U.S. Pat. No. Des. 310,529, there is shown a combined radio, cassette player, spotlight and tool box. However, the tool box portion is quite minimal compared to the radio portion and the spotlight. It therefore is not a practical design, and there is also no indication where the tool box portion is located relative to the other components. Furthermore, a radio for a construction site needs to be resistant to dust and debris, as well as rough handling.

It is thus an object of the present invention to provide a useable tool box that incorporates useful elements for a construction site.

SUMMARY OF THE INVENTION

In keeping with the above objects, the present invention is a tool box incorporating a radio, speakers therefor, and a plurality of electrical outlets wherein the tool box has a large storage compartment.

The tool box is preferably characterized by a rectangular bottom defining a preferably rectangular interior cavity to which is hingedly coupled a preferably rectangular lid. An AM/FM radio module, optionally with a cassette player in addition thereto, is disposed within the interior cavity at the front side of the bottom. Two speakers are disposed in the front side of the bottom so as to project sound from the front.

So as to protect the speakers from dust, water, and other elements, they should be mounted flush with the front of the tool box. For further protection, it is preferable that the speakers be made of a water or moisture resistant material. A grill should also be fitted over the speakers to protect against rupturing them.

The various knobs, dials, and buttons necessary for the control of the radio are disposed on the top portion of the radio module and are preferably adapted to inhibit the intrusion of dust and debris therein. This may be accomplished by disposing gaskets underneath each of the control knobs. The controls may be either analog or digital.

The radio module has a slim or narrow profile along the inside front side of the bottom in order to maximize the useable space within the interior cavity. For further protection a plastic cover may optionally be placed over the radio module, keeping it separate from the remainder of the tool box interior.

Even with the protective measures for the radio module in place, it is still recommended that the lid remain closed during use. This further reduces the level of dust contamination while at a job site. It will also reduce or eliminate the amount of moisture that enters the box in the case of a sudden rain shower.

Additionally, a plurality of GFI protected electrical sockets are disposed in the front side of the bottom, preferably between the speakers for plugging in various types of electrical tools. An input socket that is electrically coupled to the plurality of electrical sockets is also disposed in the front side. The input socket is adapted to receive an extension cord to power the plurality of electrical sockets.

The tool box is made of a durable and strong material. It should be able to withstand the rigors of a construction site as well as be able to act as step to stand on.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein.

DETAILED DESCRIPTION

Figure 1:
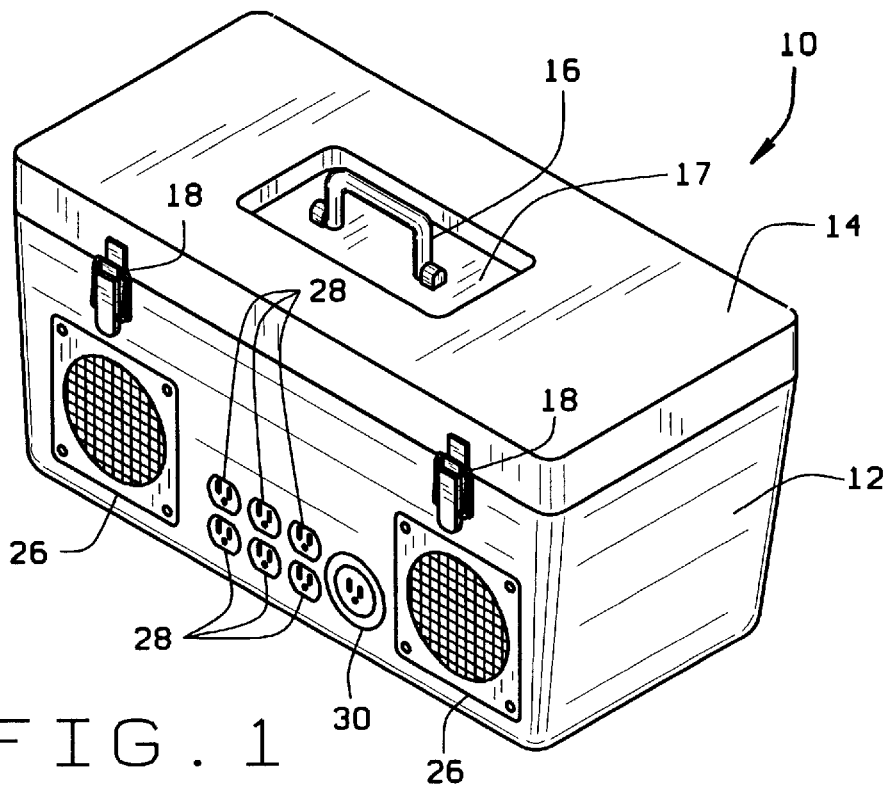
FIG. 1 is a perspective view of the present tool box.
Figure 3:
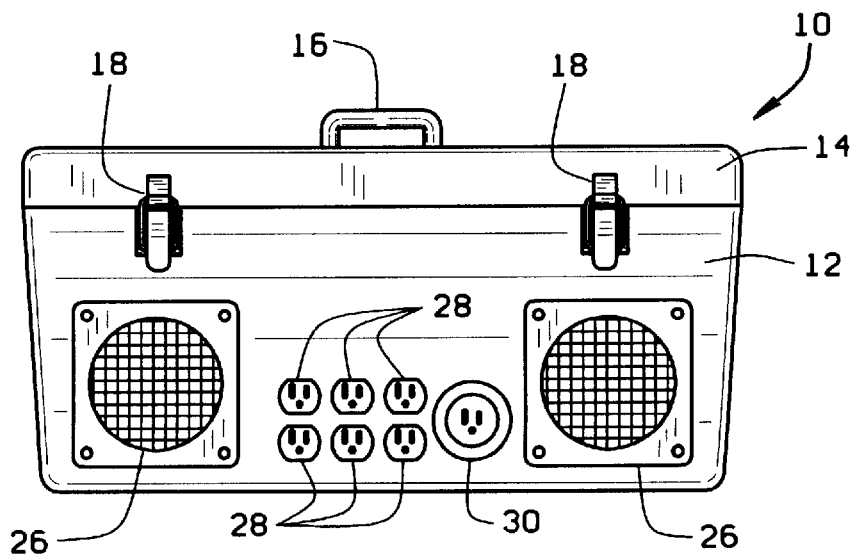
FIG. 3 is a front view of the present tool box.

Referring now to FIG. 1, the present invention, a tool box 10 is shown generally. The tool box 10 primarily consists of two parts: a bottom 12 and a lid 14. The bottom 12 is a hollow, rectangular box open at the top. It is best made of metal or durable plastic, to withstand the severe trauma to which such equipment is subjected at a construction site.

The lid 14 is designed to fit with the bottom 12, and is preferably made of the same material with close tolerances to keep out as much moisture and dust as possible. The lid 14 is permanently secured to the bottom 12 with a plurality of hinges (not shown) in the back. When closed, the lid 14 is also secured to the bottom 12 in the front with one or more latches 18. A handle 16 is disposed on the lid 14, preferably in a recessed area 17, for easy transport of the tool box 10. The recessed area 17 also allows for multiple units to be stacked upon one another.

Figure 2:
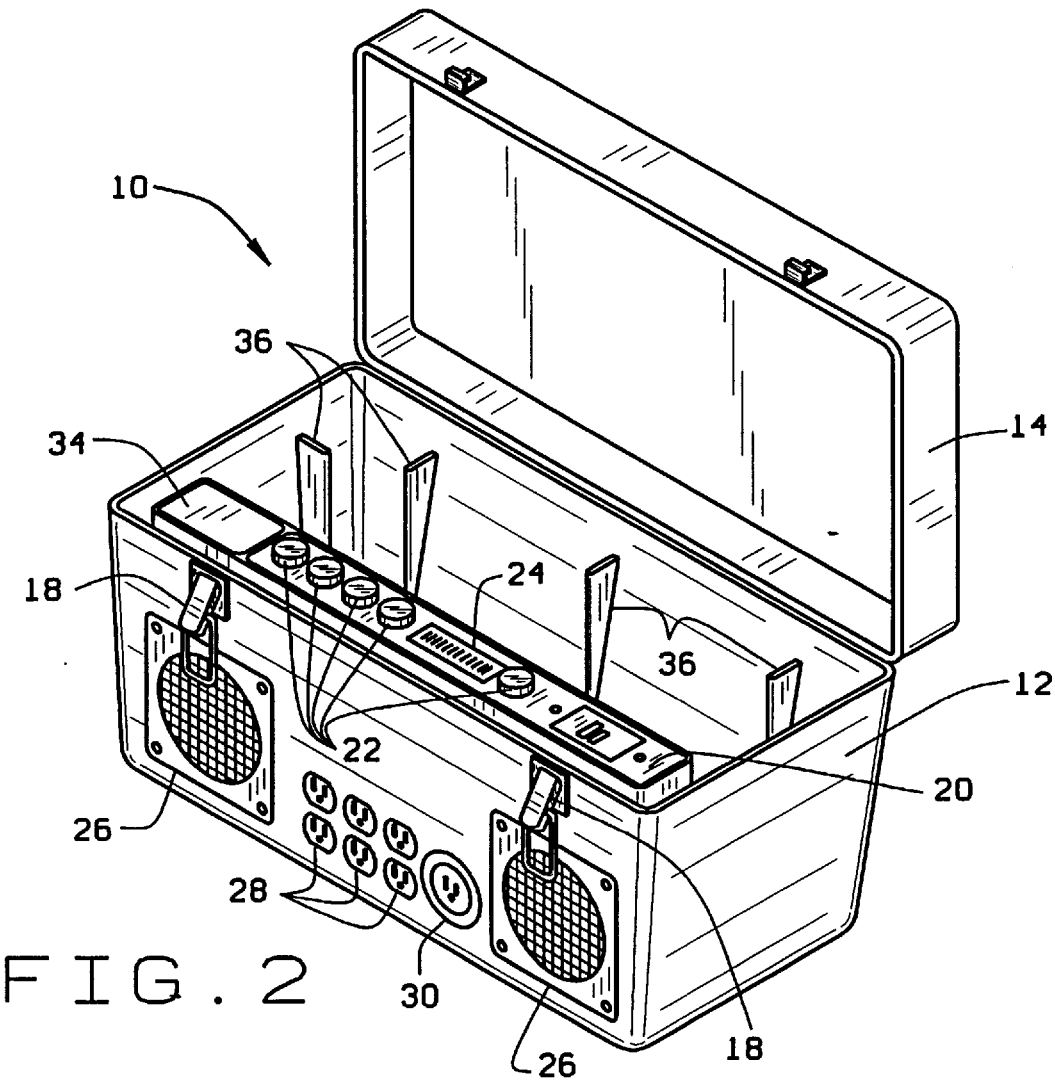
FIG. 2 is a perspective view of the present tool box with the lid in the open position, exposing the interior tool storage space and thin profiled radio therein.
Figure 4:
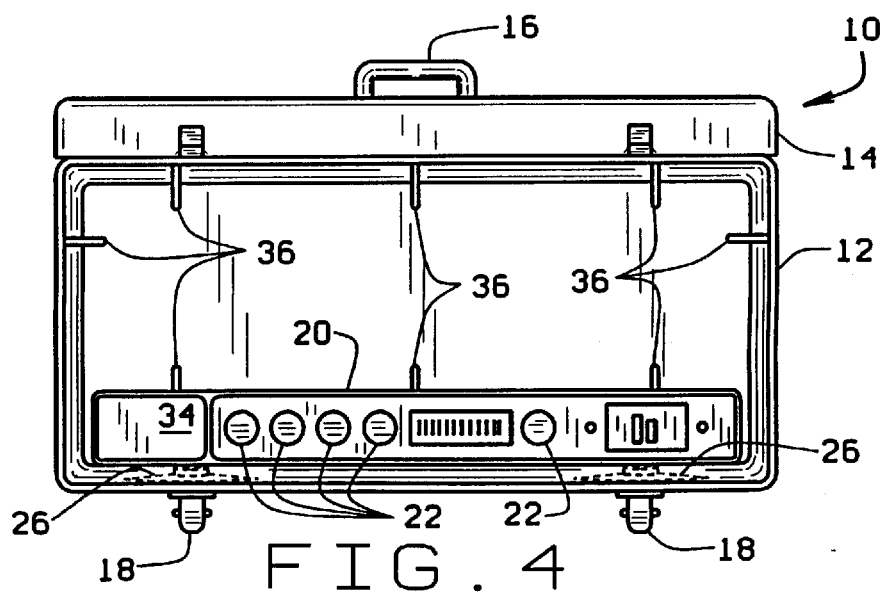
FIG. 4 is a top plan view of the present tool box with the lid in the open position.

As shown in FIG. 2, a radio unit 20 is disposed within the bottom 12, preferably toward the front thereof. The radio unit 20 should have a slim profile to maximize the area of the tool box 10 used to store tools. The radio unit 20 should preferably be adapted for use in a dusty environment. To aid this objective, gaskets may be placed under the control knobs 22 of the radio unit 20 or special knobs may be used. A tuning indicator 24 is also shown on the face of the radio unit 20, and optionally an audio cassette tape player, CD player, or the like may be integrated with the radio unit 20. An antenna (not shown) may be integrated into the box itself for better reception.

One or more speakers 26 are mounted preferably in the front face of the bottom 12. The speakers 26 should be mounted either flush with or recessed from the front face of the bottom 12 to reduce exposure to precipitation. As additional protection from moisture and as protection from dust and other elements, the speakers 26 should also be made of a water or moisture resistant material such as speakers designed for marine use as is known in the art. It is also preferable that a grill be fitted over the speakers to provide protection from puncturing.

Another element integrated into the tool box 10 is a plurality of standard 115V AC power outlets 28. Any standard outlet may be used such as part number 8200-G4 by Leviton. The outlets 28 may be mounted anywhere on the tool box 10, but should preferably be on the exterior to allow the tool box 10 to be kept closed even during use.

The power outlets 28 and the radio unit 20 both receive their power by being electrically coupled to an input socket 30. Any standard input socket may be used, such as part number 5278-C by Leviton. The input socket 30 should also be mounted on the front face of the bottom 12. Using an input socket 30 rather than a permanently attached power cord makes transporting the tool box 10 less awkward. Furthermore, an extension cord would be required at most construction sites in any matter. All of the electrical circuitry including the power outlets 28, radio unit 20, and input socket 30, are protected by a GFI circuit breaker 32. The GFI circuit breaker 32 should be disposed within the tool box 10, and preferably on the radio unit 20.

The tool-carrying function of the tool box 10 should not be severely hampered by the inclusion of the radio unit 20 and/or power outlets 28. If the radio unit 20 is not as wide as the tool box 10, a storage compartment 34 may be coupled to one side of the radio unit 20. The storage compartment is meant only to carry small loose items. Other items may be kept in the bottom 12 behind the radio unit 20. A tray (not shown) for smaller tools may be stored in the bottom 12 as well. A plurality of tray cleats 36 may be disposed around the interior of the bottom 12 to provide a resting place for a tray in the case one is used.

It should be understood that while the present invention has been described as being adapted to receive tools (a tool box), other sizes and uses of the present box are contemplated. One such use may be for cosmetics wherein the box would be smaller. Other uses are readily apparent and non-limiting.

While the foregoing is directed to the preferred embodiments of the present invention, other and further embodiments of the invention may be devised without departing from the basic scope thereof, and the scope thereof is determined by the claims which follow.

What is claimed is:

1. A tool box comprising:
    a bottom defining a storage space therein, said bottom having a closed base, a plurality of closed sides, and an open top;
    a lid hingedly attached to said bottom;
    a radio unit disposed within said bottom;
    a speaker disposed within said bottom, said speaker operatively coupled with said radio;
    an input socket for receiving alternating-current electrical power, said input socket disposed within said bottom; and
    a plurality of power outlets disposed in said bottom and electrically coupled to said input socket.

2. The tool box of claim 1, further comprising, including said speaker, a plurality of speakers disposed within said bottom, said speakers operatively coupled with said radio.

3. The tool box of claim 2, wherein said radio has a thin profile that extends along a side of said bottom.

4. The tool box of claim 3, wherein one of said sides of said bottom is the front side, and said speaker are disposed in said front side.

5. The tool box of claim 4, wherein the front of said speakers are flush with said front side of said bottom.

6. The tool box of claim 2, wherein said speakers are made of a moisture resistant outer material.

7. The tool box of claim 2, further comprising a cover mounted over said speakers.

8. The tool box of claim 7, wherein said cover is a grill configuration.

9. The tool box of claim 1, wherein one of said sides of said bottom is the front side, and said power outlets are disposed in said front side.

10. The tool box of claim 1, further comprising a handle disposed upon said lid.

11. The tool box of claim 10, wherein said handle is disposed within a recess on said lid.

12. The tool box of claim 1, further comprising one or more latches, a portion of each said latch disposed on said bottom, and another portion of each said latch correspondingly disposed on said lid.

13. The tool box of claim 1, further comprising a GFI circuit protector operatively coupled to said power outlets.

14. The tool box of claim 1, further comprising an audio cassette tape player disposed within and integrated with said radio unit.

15. The tool box of claim 1, further comprising an audio compact disc player disposed within and integrated with said radio unit.

16. The tool box of claim 1, further comprising protecting means disposed within said bottom to protect said radio unit from dust and other elements.

17. The tool box of claim 16, wherein said protecting means consists of a seal separating said radio unit from the remainder of the inside of said bottom.

18. The tool box of claim 17, wherein said radio unit contains a plurality of control knobs, and further comprising a gasket disposed beneath each said knob.

19. The tool box of claim 1, further comprising reinforcement ribs disposed about said bottom and said lid.

* * * * *